N. A. CONKLIN.

Machines for Removing the Germs from Corn.

No. 151,092. Patented May 19, 1874.

Witnesses:
Robert B. Smith
Geo. H. Westerfield

Inventor:
Nathaniel Conklin

UNITED STATES PATENT OFFICE.

NATHANIEL A. CONKLIN, OF BROOKLYN, NEW YORK.

IMPROVEMENT IN MACHINES FOR REMOVING THE GERMS FROM CORN.

Specification forming part of Letters Patent No. 151,092, dated May 19, 1874; application filed January 17, 1874.

*To all whom it may concern:*

Be it known that I, NATHANIEL A. CONKLIN, of Brooklyn, New York, have invented Improved Teeth for Corn-Chitting Machines, of which the following is a specification:

My invention consists in arranging projecting loops of sheet metal so as to form teeth for the working-surfaces of comminuting and corn-chitting machines.

Figure 1:
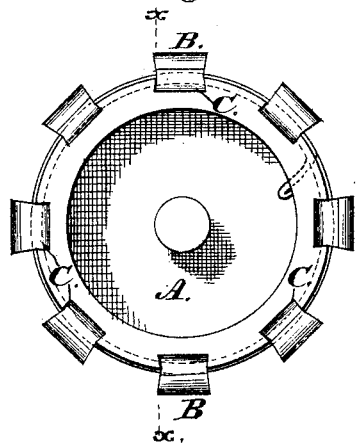
Figure 2:
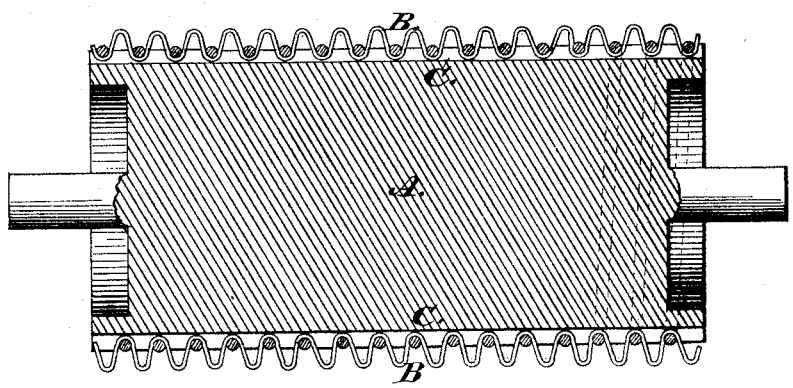

Figure 1 of the accompanying drawings is an end view, and Fig. 2 a longitudinal section, of a chitting-cylinder.

The cylinder A has teeth B B formed on its surface, by securing in the dovetail grooves C C strips of thin sheet-steel, corrugated, and having a recess at the sides. A wire, secured at intervals, is laid spirally around the cylinder in small grooves, and across the depressed corrugations of the teeth B, to prevent lateral displacement.

The advantages secured by this construction of the teeth consists, first, in mounting hardened-steel teeth on a drum of softer metal; second, in having teeth equally serviceable if driven in either direction; third, in being self-sharpening, the wear on their outer surface producing an edge on the under side; fourth, great facility in replacing worn-out teeth; fifth, the teeth, being hollow, cut into the grain more readily than solid teeth.

I do not confine myself in my first claim to this particular shape of drum or mode of fastening the teeth to the drum, but extend it to include all cases where sheet-metal loops are made to project and form the working-surface of corn-chitting and comminuting machines.

I claim as my invention—

1. The looped sheet-metal teeth B B, constructed substantially as and for the purpose set forth.

2. The teeth B B, in combination with the cylinder A, having the vertical grooves C C and a spiral groove formed on its surface to receive the teeth, and a wire for fastening them, respectively, substantially as shown and described.

NATHANIEL A. CONKLIN.

Witnesses:
ROBERT B. SMITH,
GEO. H. WESTERFIELD.